United States Patent Office 2,930,243

Patented Mar. 29, 1960

2,930,243

DICTATION MACHINE

Barton A. Proctor, Larchmont, N.Y., assignor, by direct and mesne assignments, to Proctor Dictating Machine Corporation, New York, N.Y., a corporation of New York Original application April 19, 1950, Serial No. 156,869, now Patent No. 2,685,772, dated August 10, 1954. Divided and this application June 23, 1954, Serial No. 439,439

1 Claim. (Cl. 74—27)

This invention relates to dictation machines and has for its primary object the provision of a machine which will be of small size and light weight, inexpensive to manufacture and efficient and dependable in use.

A salient feature of the invention has to do with turntable drive mechanism, the turntable being driven from a constantly running motor through an operator-controlled electro-magnetic clutch.

A further important feature of the invention has to do with the drive of the pick-up and cutter carriage from the turntable, this drive being effected through a gear which is unitary with a carriage support and is swingable therewith into a position concentric with the turntable in which it is connected to be driven by the turntable.

A further feature of the invention has to do with novel back-spacer mechanism. In accordance with this feature, the carriage is operated through a feed screw, the feed screw being frictionally driven. A ratchet wheel affixed to the feed screw is adapted to be engaged and driven backward step by step, as desired. The carriage is thus backspaced while the record remains stationary.

Other objects and advantages will hereinafter appear.

In the drawing forming part of this specification:

Figure 1 is a view in front elevation of an illustrative machine embodying features of the invention;

Figure 2 is a plan view of the machine illustrated in Figure 1;

Figure 3 is a central sectional view taken upon the line 3—3 of Figure 2, looking in the direction of the arrows;

Figure 4 is a sectional view taken upon the line 4—4 of Figure 6, looking in the direction of the arrows;

Figure 6 is a sectional view taken upon the line 6—6 of Figure 2, looking in the direction of the arrows;

Figure 7 is a sectional view taken upon the line 7—7 of Figure 3, looking in the direction of the arrows;

Figure 8 is a sectional view taken upon the line 8—8 of Figure 2, looking in the direction of the arrows;

Figure 9 is a sectional view taken upon the line 9—9 of Figure 2, looking in the direction of the arrows;

Figure 10 is a sectional view taken upon the line 10—10 of Figure 2, looking in the direction of the arrows;

Figure 11 is a fragmentary view in front elevation, partly broken away, showing details of the principal manual control lever and associated parts;

Figure 12 is a vertical sectional view, showing the feed screw and drive mechanism associated with it;

Figure 13 is a sectional view taken upon the line 13—13 of Figure 2, looking in the direction of the arrows;

Figure 14 is a sectional view taken upon the line 14—14 of Figure 2, looking in the direction of the arrows.

Figure 5:
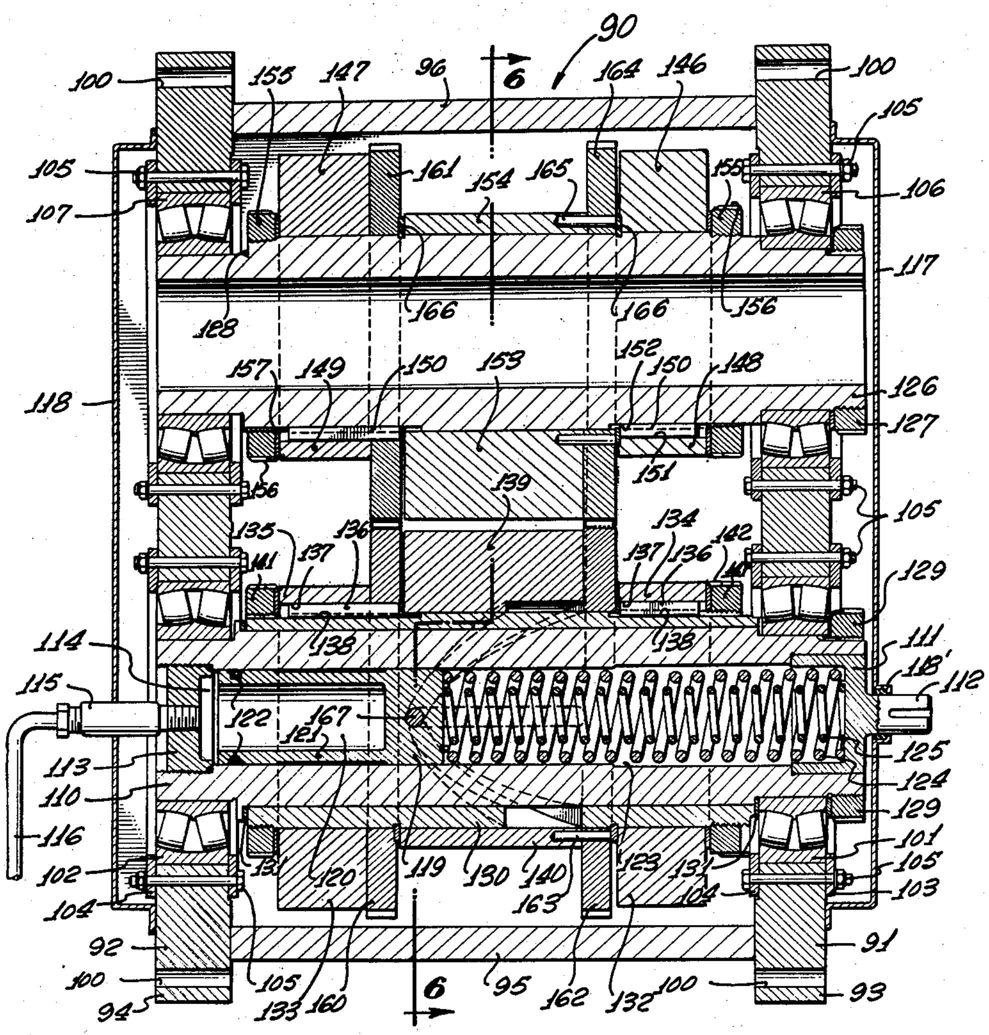
Figure 5 is a fragmentary sectional view taken upon the line 5—5 of Figure 3, looking in the direction of the arrows.

The machine comprises a lower frame member 1 having front and rear walls 2 and 3 (Fig. 3), side walls 4 and 5 and a top wall 6 (Fig. 6). Frame extension members 7 and 8 are mounted upon the frame member 1.

The top member 6 is formed wtih cut-outs or openings 9 (Figs. 2 and 6) for lightening the structure, and with a recess 10 in which a turntable 11 operates. The top member 6 is formed with a circular opening concentric with the turntable axis. A flanged cup 12, Fig. 3, is fitted into a circular opening and is attached to the underside of the member 6 by fasteners 13 which extend through the flange 14 of the cup 12 and are threaded into the member 6.

The turntable 11 is, itself, formed with a central circular opening in which the upper rim of a flanged cup member 15 is fitted (Fig. 3). The turntable is attached by screws 16 to the cup 15, the screws being passed through the turntable and threaded into a flange 17 of the cup. A headed and shouldered bearing screw 18 is passed axially downward through the center of the base of the cup 15 and is threaded into the center of the base of the cup 12. The cup 12 is formed with a rabbet 19 in which a ball bearing 20 is mounted. The bearing balls are arranged to engage the cups 12 and 15 to provide steadying support and frictionless bearing for the turntable.

Beneath the top plate 6 of the casing member 1 there is provided a loudspeaker 21 (Fig. 3) which is attached in any suitable manner to the front frame wall 2. The wall 2 is provided with louvers 22 which conceal and protect the loud speaker while permitting the sound to issue naturally from the interior of the frame.

Mechanism for driving the turntable is also supported beneath the wall 6, being suspended from the wall 6, itself. The drive mechanism comprises a motor 23 (Figs. 3, 4 and 6) which is carried by brackets 24. The brackets 24 are secured between felt washers 25 and 26 upon the shanks of screws 27. The parts are clamped together by means of nuts 28 threaded on the respective screws 27. The motor shaft 29 has fast upon it a fan 30 for circulating cooling air, and the wall 3 adjacent the fan is formed with numerous perforations 31 so that air may pass through. The shaft 29 also has fast upon it a flanged pulley 32 which, through a belt 33, drives a massive pulley 34 of comparatively large diameter. The pulley 34 serves also as a fly-wheel.

The pulley 34 is revolubly mounted upon a shaft 35 (Fig. 3), which shaft is supported from the wall 6 by a block 36. The pulley 34 includes a central sleeve portion 37 which bears upon the shaft 35. A clutch member 38 is slidably mounted upon the sleeve portion 37 and is formed with one or more projecting pins 39 which pass into openings 40 of the pulley 34 so that the clutch member will always turn in unison with the pulley, regardless of its position axially of the shaft. The clutch member 38 is formed with a circumferential groove 41 in which shoes 42, see Fig. 7 also, of a shifting fork 43 are received. The clutch member 38 is adapted to be shifted into and out of engagement with a complementary clutch member 44.

The clutch member 44 is revolubly mounted upon an enlarged portion 45 of the shaft 35 between the block 36 and the inner end of the sleeve portion 37 of the pulley 34. The clutch member 44 carries a feed wheel 46 having a rubber tire 47 which is adapted to bear against the lower face of the turntable 11 for driving the turntable.

The purpose of the clutch is to enable the motor 23 and the pulley 34 to run constantly while permitting the turntable to be started and stopped at will.

As the parts are shown in Figure 3, the electro-magnet is unenergized, so that the spring 59 is effective through the fork 43 to shift the clutch member 38 into engagement with the clutch member 44, thereby to drive the feed

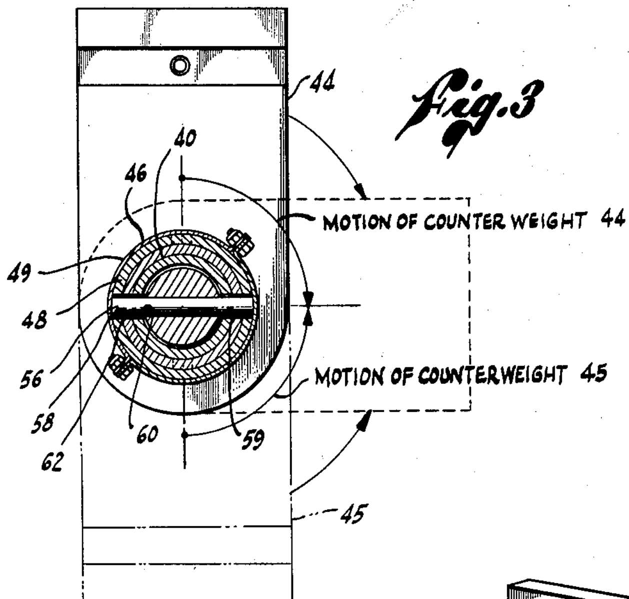
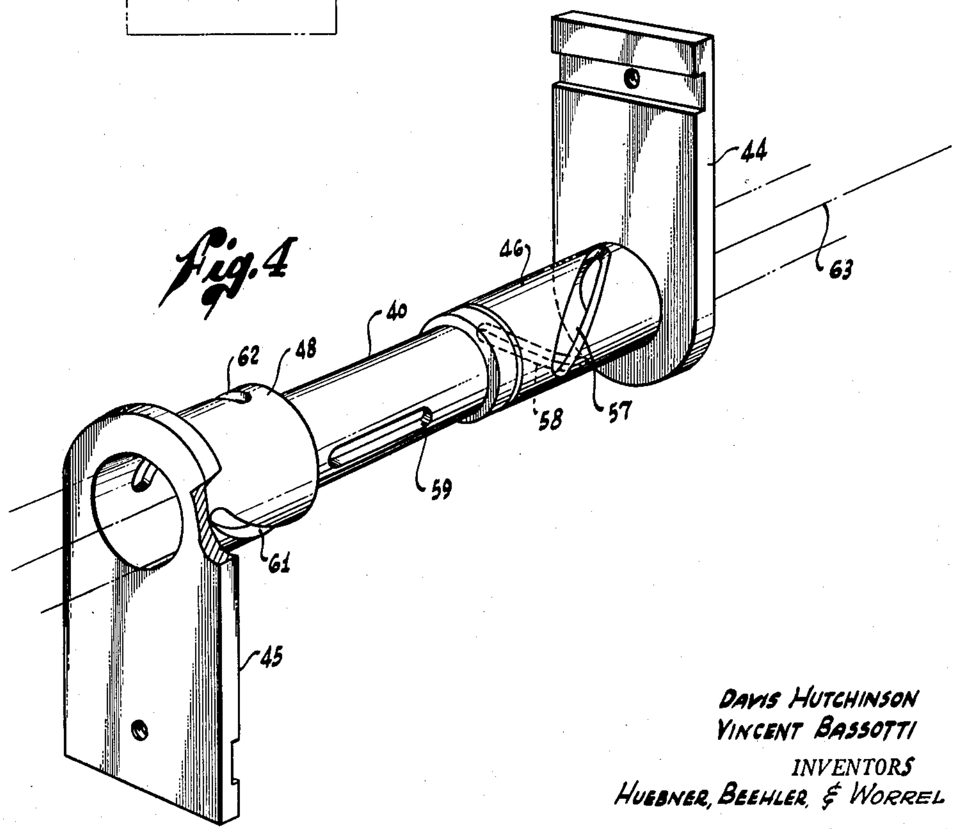
DAVIS HUTCHINSON
VINCENT BASSOTTI
INVENTORS
HUEBNER, BEEHLER, & WORREL
ATTORNEYS
By Vernon D. Beehler DAVIS HUTCHINSON
VINCENT BASSOTTI
INVENTORS
HUEBNER, BEEHLER,
& WORREL
ATTORNEYS
BY March 29, 1960 D. HUTCHINSON ET AL 2,930,244
VIBRATION FORCE GENERATOR
Filed July 5, 1957 5 Sheets-Sheet 4
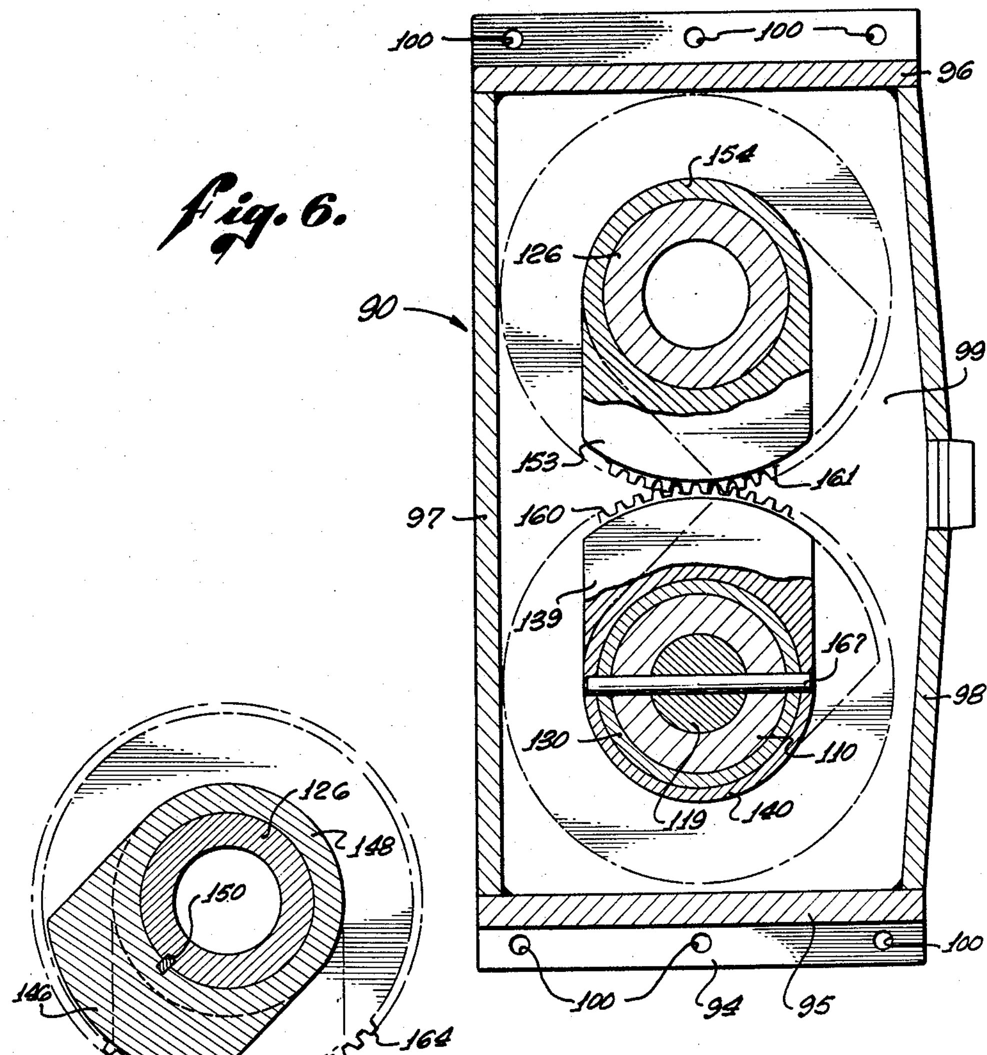
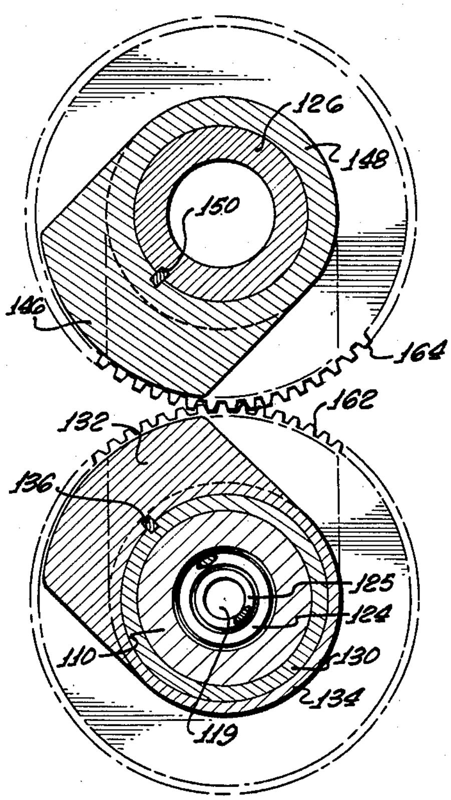
Fig. 7.
DAVIS HUTCHINSON
VINCENT BASSOTTI
INVENTORS
HUEBNER, BEEHLER, & WORREL
ATTORNEYS
BY Vernon D. Beehler VIBRATION FORCE GENERATOR
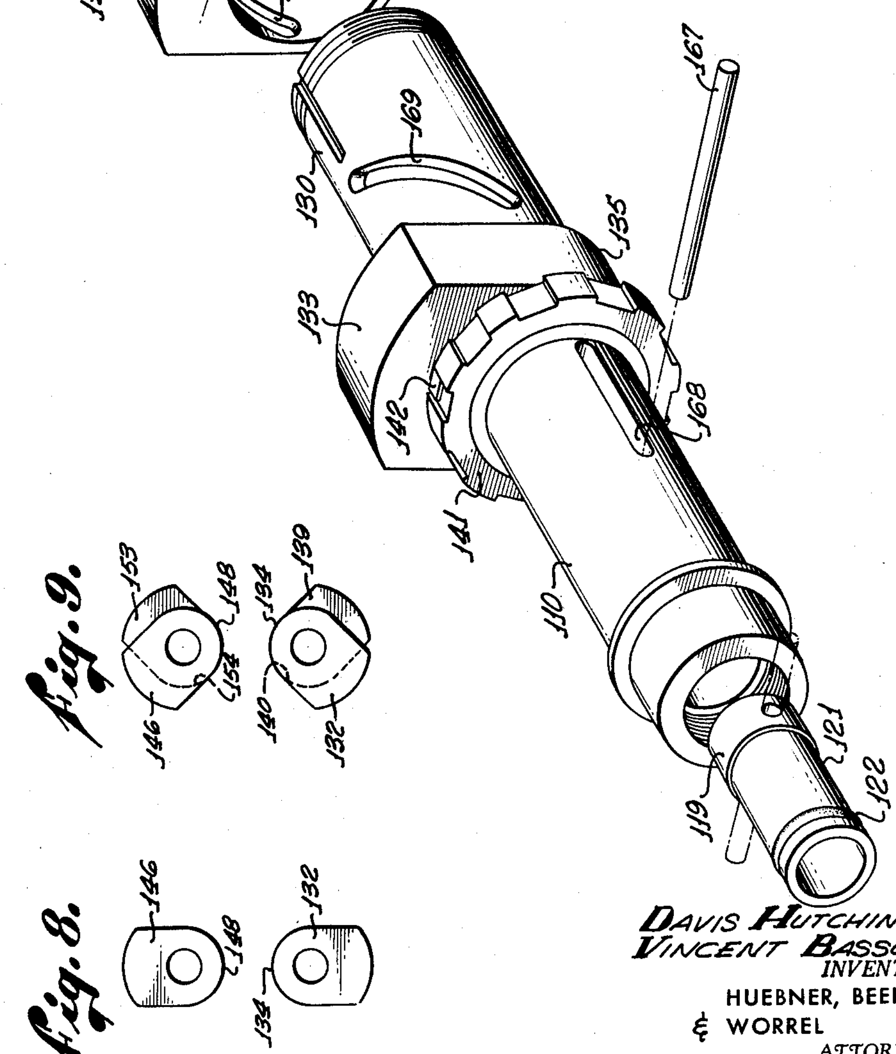
DAVIS HUTCHINSON
VINCENT BASSOTTI
INVENTORS
HUEBNER, BEEHLER, & WORREL
ATTORNEYS
BY Vernon D. Beehler United States Patent Office 2,930,244

Patented Mar. 29, 1960

2,930,244

VIBRATION FORCE GENERATOR

Davis Hutchinson, Northridge, and Vincent E. Bassotti, Burbank, Calif., assignors, by mesne assignments, to Royal Industries, Inc., Alhambra, Calif., a corporation of California Application July 5, 1957, Serial No. 670,150

9 Claims. (Cl. 74—61)

The application relates to machines capable of generating a vibrational force and has particular reference to a vibration force generator which can be adjusted during operation to vary the character of the generated vibrational force.

Vibrators in general have come into extensive use for a great variety of purposes, some being test purposes to simulate actual vibration conditions and others being for the employment of vibrational force to perform some type of work.

Some occasions arise where the vibrational force generated needs to be of considerable magnitude and which at the same time for some special purpose needs to be subject to change and alteration. Many such requirements require immediate change even while the device is in operation, the required change being such as to encompass the entire limits of vibrational force effect of the mechanism.

Among vibrators heretofore employed many have lacked a type of construction permitting a change in the character of vibrations during operation. This indeed has been most prevalent in vibrators where the vibratory force need be of great magnitude. To necessitate stopping the machine for each change is a considerable handicap upon its use. Many such mechanisms have other handicaps such as structures which fail to permit infinite variation within their limits, necessitating therefore an approximation of the vibration character required.

In those few machines where some change might be accomplished during operation, they have not been machines powerful enough to be capable of a force output of vibrational energy of the magnitude of that required in many instances.

It is therefore among the objects of the invention to provide a new and improved vibration force generator which is capable of generating a vibratory force of very substantial magnitude and which at the same time is capable of having that force adjusted during operation of the machine between zero and the maximum force of which the machine is capable.

Another object of the invention is to provide a new and improved adjusting mechanism for a vibration force generator capable of being manipulated during operation of the device, the adjustment being simple, easy and accurate of attainment.

Still another object of the invention is to provide a new and improved vibration force generator or vibrator capable of quick and accurate adjustment during operation and which is so constructed that once the adjustment is made the mechanism will hold the adjustment as long as operation continues.

A further object of the invention is to provide a new and improved infinitely adjustable vibrator which can be made in heavy capacity and one wherein the mechanical parts are in a compact arrangement, thereby to minimize space, improve the ease of fabrication and assembly and at the same time constitute a rugged device capable of holding a set vibration for extensive periods of time without alteration.

An object also is to provide a new and improved vibrator which can be built in a single stage or multiple stages synchronized with respect to adjustment so as to greatly extend the character and magnitude of vibration possible.

With these and other objects in view, the invention consists in the construction, arrangement and combination of the various parts of the device whereby the objects contemplated are attained, as hereinafter set forth, pointed out in the appended claims and illustrated in the accompanying drawings.

In the drawings:

Figure 1 is a longitudinal sectional view of the device shown at a balanced or neutral position of adjustment.

Figure 2 is an end view taken on the line 2—2 of Figure 1.

Figure 3 is a cross-sectional view taken on the line 3—3 of Figure 1.

Figure 4 is a perspective view of the central shaft subassembly showing the mounting of the eccentric weights on the shaft.

Figure 5 is a vertical sectional view of a modified form of the device.

Figure 6 is a cross-sectional view taken on the line 6—6 of Figure 5 showing the device in one position of adjustment.

Figure 7 is a fragmentary view of the portion of the device containing the eccentric weights showing the adjustment in a position slightly different from the adjustment of Figure 6.

Figure 8 is a schematic view showing the weights of two portions of the device in one position of adjustment.

Figure 9 is a view similar to Figure 8 showing the weights in a different position of adjustment.

Figure 10 is an exploded view of one of the shaft assemblies showing the relationship of the adjusting sleeves to the weights.

In the embodiment of the invention chosen for the purpose of illustration there is shown in mounting comprising a base 10 having legs 11 and 12. To facilitate application of the device to various circumstances a second base 13 may be employed having mounted thereon legs 14 and 15. Those portions of legs 11 and 14 which adjoin each other are in fact joined by means of a hub 16. Similarly legs 12 and 15 are joined by a hub 17. In the hub 16 is a bearing recess 18 in which is mounted outer and inner rings 19 and 20, respectively, of a roller bearing. Similarly in the hub 17 are outer and inner rings 21 and 22, respectively, of a second bearing. A bearing retainer 23 secured by machine screws 24 to the hub 16 holds the bearing ring 19 in position. A seal 25 is held in place by the retainer. On the opposite side of the hub is a housing assembly 26 secured to the hub by appropriate machine screws 27. The housing assembly makes provision for a pocket 28 communicating with the recess 18 adjacent a shoulder 29 which aids in holding the ring 19 in place. A seal 30 mounted in the housing assembly cooperates with the seal 25 to effectively seal the chambers identified by the recess 18 and pocket 28, thereby to confine a lubricant in that space.

On the opposite side is a similar bearing retainer 31 held by machine screws 32 and equipped with a seal 33. A housing assembly 34 is secured to the opposite side of the hub 17 by machine screws 35 and similarly provided with a seal 36. The housing assembly 34 provides a pocket 37 which communicates with a recess 38. Seals 33 and 36 form a means for sealing lubricant within the pocket and recess thus described.

A hollow shaft 40 is mounted on the inner rings 20 and 22 of the bearings and extends through both hubs.

A solid stub shaft 41 is non-rotatably attached to the hollow shaft by means of a pin 42. An axle 43 may be provided for the attachment of any necessary and conventional drive means.

Vibrational effect is accomplished by mounting upon the hollow shaft 40 a counterweight 44 and a second counterweight 45. The counterweight 44 includes a sleeve 46 which immediately surrounds the hollow shaft 40 in rotational relationship. An annular extension 47 of the sleeve extends into the bearing retainer 23 where it has a rotating sealed relationship with the seal 25.

The counterweight 45 includes a sleeve 48 which surrounds the sleeve 46 in rotational relationship. A cylindrical retainer 49 may be employed to serve as a retainer to keep the pin 56 from coming out. Spacers 50, 51 serve to keep the axial relationship of sleeve 46 true and a retainer 52 keeps the sleeve 46 in position axially.

A plug 55 is more or less centrally located within the hollow shaft 40. The plug carries a camming pin 56 which is important to the adjustment of the counterweights in order to place them in different angular positions with respect to each other, thereby to change the vibration effect of the machine. Adjustment of the counterweight 44 is accomplished by providing in the sleeve 46 a pair of oblique slots 57 and 58, seen to good advantage in Figure 4, these slots being adapted to receive the camming pin in sliding relationship therein. The hollow shaft 40 is provided with a pair of axially extending slots 59 and 60 through which opposite ends of the camming pin extend so as to reach into the oblique slots 57 and 58. It will be appreciated that the exploded view illustrated in Figure 4 is for the purpose of revealing the location and shape of these slots for which purpose the sundry parts are separated axially to positions which they might have prior to assembly into the relationship illustrated in Figure 1.

The sleeve 48 which supports the counterweight 45 is also provided with a pair of oblique slots 61 and 62 which extend in an angular direction opposite from the direction of the slots 57 and 58. It will be noted from an examination of Figure 3 that the camming pin 56 is of such length that it extends entirely through the slots 59, 60, the slots 57, 58 and the slots 61, 62. It will be apparent therefore that when the plug 55 carrying the camming pin is shifted axially, the pin will move along the slots 59, 60 and by simultaneously moving within the slots 57, 58 and the slots 61, 62, the sleeves 46 and 48, respectively, and their attendant counterweights will be rotated in opposite directions with respect to each other. In this way the counterweights 44 and 45 can be shifted from their balanced positions, illustrated in Figures 1, 3 and 4, to a series of positions approaching each other in an angular direction until both counterweights are on the same side of a central axis 63 which will be the maximum unbalanced condition.

To provide a mechanism for effecting the shifting just described a screw shaft 70 threaded throughout the length of its exterior is provided at its inner end with a bearing box 71 within which a bearing 72 is mounted in position such that a stub shaft 73 on the plug 55 rotates freely with respect to the screw shaft 70. The bearing box must likewise as shown be free from engagement with the inside wall of the hollow shaft 40 so that it is enabled to shift endwise or axially with respect to the hollow shaft.

To properly mount the screw shaft there are provided bearings 74 and 75 spaced by a retainer 76, the bearings being contained within a left end recess 77 at the interior of the hollow shaft 40. A hollow stub shaft 78 rotates within the bearings 74 and 75, the hollow stub shaft having an end portion 79 on which is keyed a sprocket 80 by means of a key 81. A set screw 82 anchors the sprocket in place. It should be noted in this connection that the interior of the end portion 79 has a threaded engagement with threads on the exterior of the screw shaft 70.

To guide an outer end 83 of the screw shaft there is provided a guide arm 84 rotatably secured to the screw shaft by means of a nut 85. The guide arm 84 fits over a guide post 86 in such relationship that it can slide axially with respect to the guide post.

In operation it can be assumed that the hollow shaft 40 is being rotated at a suitably rapid rate by some conventional power source which will cause the counterweights 44 and 45 to rotate. At the same time the plug 55 will caused to rotate but the screw shaft 70 will not need to rotate inasmuch as it is mounted within the bearings 74 and 75 and has a bearing connection to the stub shaft 73 whereby the hollow shaft and attendant parts can rotate while the screw shaft stands still. It can be assumed at the initiation of operation that the counterweights are balanced on opposite sides of the axis 63. While the counterweights are being rotated, should it be necessary to change their relative location with respect to each other, thereby to initiate vibratory action in the generator, the sprocket 80 is rotated. This can be accomplished with the aid of a chain 87. Rotation of the sprocket causes the end portion 79 of the hollow stub shaft 78 to rotate. Inasmuch as the screw shaft is prevented from rotation by presence of the guide arm 84 and guide posts 86, as the end portion 79 threads itself with respect to the screw shaft, the screw shaft will move from left to right axially as viewed in Figure 1 until, let it be assumed, that the guide arm 84 moves from its solid line position in the direction of the arrow to the broken line position 84′. If it be assumed that in balanced position of the counterweights 44 the camming pin 56 lies at the left ends of the oblique slots and of the slots 59, 60, movement from left to right along the axially directed slots 59, 60 will be effected by movement of the plug 55 from the solid line position of Figure 1 to the broken line position 55′. The plug is moved because of thrust of the bearing box 71 against the stub shaft 73 and hence against the plug 55. Movement of the plug moves the camming pin 56. As the camming pin moves, it will exert a camming action on the sides of the oblique slots of both sleeves 46 and 48, causing the sleeves and their corresponding counterweights to rotate with respect to each other angularly while being revolved about the axis 63. As promptly as an unbalanced condition is achieved, vibrational force will begin as long as the hollow shaft 40 is being rotated. The further the screw shaft is moved from left to right, the more nearly will the position of the counterweights approach each other until they are both on the same side of the axis 63 which is maximum vibration-producing condition.

Conversely, by rotating the sprocket 80 in a reverse direction the plug 55 can be moved from right to left drawing with it the camming pin 56 and the camming pin will again have a camming action on the sides of the oblique slots but in a reverse direction thereby returning the counterweights toward balanced condition. As long as the sprocket is not rotated, the position of the screw shaft will remain fixed as will also therefore the position of the camming pin 56 and hence despite continued rapid rotation of the hollow shaft 40 there will be no change in adjustment of the counterweights and the precisely desired vibration character will be maintained. It is clear also that any variation in eccentricity can be achieved precisely by manipulation of the sprocket 80 at any time, either during operation or while the machinery is at rest, thereby to make a setting for a vibration of desired character between balanced condition and maximum condition for the apparatus.

In the form of device illustrated in Figure 5 shafts supporting the eccentric weights are shown in a multiple arrangement, one shaft being driven by the other and means being provided for setting the eccentricity of the weights on one shaft to correspond with the eccentricity of weights on the other shaft.

In this form of device there is shown a base or housing 90 where, for example, end plates 91 and 92 may terminate at lower ends thereof in feet 93, 94 for the purpose of enabling attachment of the base to some suitable mounting, not shown. Panels 95 and 96 on the bottom and top, respectively, span the distance between the end plates and a front wall 97 and rear wall 98 complete the enclosure of a chamber 99. Bolt holes 100 may form a useful means of securement for the base.

In the form of device particularly illustrated in Figure 5, the lower portion of the end plates 91 and 92 serves to retain a set of bearings 101 and 102, respectively. Annular rings 103 and 104 bolted in place by means of bolts 105 serve to hold the bearings in position in each instance.

In the upper portion of the end plates there is provided a comparable set of bearings 106 and 107 similarly mounted and retained.

Rotatably mounted in the lower set of bearings is a composite shaft assembly comprising a hollow shaft 110 having a cap 111 at one end equipped with stub shaft 112 which may serve as a driven shaft when connected to some suitable source of rotation. At the opposite end of the hollow shaft 110 is a plug 113 threaded into position which together with the cap 111 seals the interior of the shaft forming a pressure chamber 114. In the plug 113 is a swivel fitting 115 of a suitable conventional sort to which a hydraulic line 116 may be attached for the passage of hydraulic fluid under pressure to and from the chamber 114.

In addition covers 117 and 118 may be provided extending over the exterior of each of the end walls 91, 92, serving thereby to seal the working parts. A seal 118' serves to seal the stud shaft 112.

Within the pressure chamber 114 is a piston 119, the piston in the form of the device shown containing a pocket 120 surrounded by a wall 121 of considerable depth, there being a seal 122 on the exterior of the wall serving to seal off the pressure chamber 114 from an axial chamber 123. A heavy coil spring 124 and a light coil spring 125 extending between the cap 111 at one end and the piston 119 at the other end serve as a return spring means for the piston 119 when in operation. It will be understood that the piston 119 is adapted to reciprocate within the axial chamber 123 under hydraulic pressure against compression of the springs during operation of the device, the springs being adapted to return the piston to initial position upon release of hydraulic pressure.

The hollow shaft 110 may for purposes of description be designated a primary shaft and is adapted to drive another hollow shaft 126 aptly defined as a secondary shaft. The shaft 126 as shown is mounted in and supported by the set of bearings 106, 107. It is significant to note that the right-hand end of the shaft 126 is secured to the inner race of the bearing 106 by means of a lock nut 127 and that there is no attachment for the shaft at the opposite end to the bearing 107 other than its rotatable mounting. In fact, a shoulder 128 at the opposite end is spaced from the inner race of the bearing 107 so that there will be no endwise engagement therewith.

The hollow shaft 110 is similarly fastened to the inner race of the bearing 101 at one end only by means of a similar lock nut 129. In this instance also the opposite end of the shaft 110 is not secured in any manner endwise with respect to the inner race of the bearing 102.

Surrounding the shaft 110 is a sleeve 130 confined at the end by rings 131. The sleeve is so mounted that it is adapted to rotate with respect to the shaft 110. Mounted upon the sleeve is a pair of eccentric weights 132 and 133, these weights being provided with collars 134 and 135 immediately surrounding the sleeve. In each instance a key 136 in appropriate keyways 137 and 138 in the collar and shaft, respectively, serves to hold the weight in each instance non-rotatably upon the sleeve 130. Between the eccentric weights 132 and 133 is a third eccentric weight 139 of twice the mass of either of the weights 132, 133, the weight 139 being equal to the other two weights. A collar 140 on the weight 139 serves to provide a rotatable mounting for the weight upon the exterior of the sleeve 130.

Adjacent the outside end of each of the weights 132 and 133 is a lock washer 141 threadedly secured to the adjacent end of the sleeve 130, the lock washer in each instance being locked in position by a tab 142 of a lock ring 143.

On the secondary shaft 126 there is mounted a pair of eccentric weights 146 and 147 spaced from each other and corresponding in mass and location to the weights 132 and 133. Similarly in this instance collars 148 and 149 serve to mount the weights upon the shaft 126. Here also keys 150 received respectively in a keyway 151 in the collar and a keyway 152 in the shaft hold the eccentric weight in non-rotatable position upon the shaft. In this instance the weights are keyed directly to the shaft without the interposition of a sleeve.

A central eccentric weight 153 of twice the mass of the other weights is rotatably mounted upon the shaft by means of a collar 154. In a similar fashion lock washers 155 locked by means of tabs 156 on rings 157 serve to lock the washers in position.

In order that the secondary shaft 126 and the weights thereon may be driven by and adjusted in conformance with the rotation and adjustment of the primary shaft 110 and its weights, a gear 160 is keyed to the sleeve 130 by the same key 136 as is used to key the weight 133 thereto. Gear 160 meshes with a similar gear 161 which is keyed to the secondary shaft 126 by the same key 150 as is used to key the weight 147 to that shaft. With a one to one gear ratio, therefore, when the gear 160 is rotated simultaneously with the weights 132 and 133 and the primary shaft 110, the weights 146 and 147 are rotated together with the secondary shaft 126 on which they are keyed.

For rotatably connecting the larger weights 139 and 153, there is provided a gear 162 pinned to the collar 140 by means of a pin 163. The gear 162 meshes with a similar gear 164 on the shaft 126, this gear 164 being pinned to the collar 154 of the weight 153 by means of pins 165. These gears having a one to one ratio cause the large weights in each instance to move one in accordance with rotative movement of the other. Necessary spacing washers or rings 166 may be provided to preserve a working clearance between relative rotating parts.

In operation and prior to adjustment the stub shaft 112 serves to rotate the hollow shaft 110 at a selected rate of speed. A pin or rod 167 mounted in the piston 119 projects outwardly at both ends through an axial slot 168 in the shaft 110 on opposite sides. The shaft or pin 167 is long enough so that it extends outwardly first through an oblique slot 169 in the sleeve 130 on each side thereof and then through an oblique slot 170 in the collar 140 on each side. Since the pin 167 is anchored to the piston 119 and in the absence of any adjustment is also anchored to the sleeve 130, rotation imparted to the shaft 110 will be transferred directly through the gears 160 and 161 to the secondary shaft 126. Both shafts, therefore, will rotate at the same rate of speed.

Since also the pin 167 extends through the collar 140, the collar and its eccentric weight 139 will rotate together with the gear 162 and by transfer of rotary motion from the gear 162 to the gear 164, that rotary motion will be transferred to the other large eccentric weight 153. In initial adjustment it may be presumed that the eccentric weights all occupy the relative positions suggested in Figure 6, namely, weights on the opposite shafts being directed in the same general direction toward each other so that the eccentricity is perfectly balanced. During this stage of operation by rotation of the stub shaft 112 no vibration will be generated. Gears 160 and 161 and 162 and 164 are same pitch diameter and are identical.

To unbalance the weights and thereby institute vibration, hydraulic pressure is sent to the pressure chamber 114 through the hydraulic line 116 and hydraulic pressure in the chamber acting against the interior of the pocket 120 of the piston 119 serves to move the piston endwise from left to right, as viewed in Figure 5, against compression in the springs 124 and 125. Movement of the piston causes the pin 167 to be moved toward the right. Since the slot 168 is straight, the pin will move freely in that slot. Since, however, the slots 169 and 170 lie in an oblique direction each opposite the other, the eccentric weights 133 and 132 keyed as they are to the sleeve 130 will be rotated in one direction whereas the larger weight 139 will be rotated in an opposite direction by movement of the pin 167 in the oblique slots 170. As indicated by the description, the large weight 139 will rotate in a direction opposite to rotation of the weights 132 and 133 by exactly the same angular distance. This eccentric loading will then set up a vibration in the device.

In transferring the eccentric weights to similarly angularly displaced positions, the intermeshing gears already referred to come into action. For example, as the weights 132 and 133 of the sleeve 130 are rotated, the gear 160 keyed thereto will rotate the gear 161 and this in turn will rotate the secondary shaft 126 to which it is keyed and hence rotate the weights 146 and 147 thereon to the same extent.

At the same time rotation in an opposite direction of the weight 139 is accompanied by rotation of the gear 162 in the same direction. This in turn causes the gear 164 to rotate and inasmuch as it is pinned to the eccentric weight 159, this weight will rotate in a direction opposite to rotation of the weights 146 and 147 to the same degree. It follows, therefore, that the vibration generated or created will be augmented to a figure virtually double that created by a single vibrating shaft by reason of the fact that the two shafts each carry the same complement of eccentric weights and may be adjusted in comparable position.

It will further be appreciated that by this simple direct connection there is virtually no limit, except that dictated by practice to the number of separate independent shafts carrying eccentric weights which might be included in the device.

The further the piston 119 is pushed, the greater will be the degree of rotation of the eccentric weights from a normal balanced condition. The throw of the piston and its pin may be such that the weights can be moved as much as 180 degrees away from initial position.

Similarly, should it be desired to diminish the amount of rotation, the hydraulic pressure can be shut off and a portion of the hydraulic fluid be permitted to flow back toward its place of origin aided by action of the coiled springs 124 and 125. These strong springs will move the piston back as far as permitted by the expulsion of hydraulic fluid in order to return the rotative position of the sundry weights part way or, if desired, all the way back to initial position.

The device of the modified form has the advantage of containing a very great potential source of vibration in a small package under circumstances where a very precise control is maintained over the degree of vibration by a mechanism which admits of rather fine adjustment respecting the relative degree of rotation of the eccentric weights. The arrangement, moreover, is such that even though only two composite shafts are shown equipped with the eccentric weights in question, the same general interconnection may be employed in the event still more sets of weights might be desirable. The device, moreover, is completely housed and sealed within a surrounding casing wherein portions can be preserved from detrimental outside effects and maintained under substantially uniform operating conditions.

From the foregoing description it will be clear that there is provided a compact positively adjustable vibratory force generator which is capable of holding its setting no matter at what rate is may be rotated. Since the holding arrangement is of such positive character, additional weights may be applied to the counterweights by anchoring such weights with suitable conventional screws within the tapped holes 88 and 89 on the respective counterweights 44 and 45. This practice is adaptable to both forms of the device. It will be clear also from the combination shown and described that the number of counterweights need not be limited to the two counterweights shown. In practice an apparatus of the type herein initially described is capable of being designed in a form capable of generating 30,000 pounds of vibratory force. The combination described, however, is of such character that by changing the weights and the revolutions per minute from 3300 to some other appropriate rate, different vibrational effects can be achieved without the necessity of any material alteration in the structural arrangement. In practice it has been found possible by use of the machine to generate a vibratory force of 60,000 pounds.

While we have herein shown and described our invention in what we have conceived to be the most practical and preferred embodiment, it is recognized that departures may be made therefrom within the scope of our invention, which is not to be limited to the details disclosed herein but is to be accorded the full scope of the claims so as to embrace any and all equivalent devices.

Having described our invention, what we claim as new and desire to secure by Letters Patent is:

1. A vibration force generator comprising a base, spaced bearings on the base, a rotating assembly mounted on the bearings comprising a hollow shaft, a sleeve on said shaft and rotatable relative thereto and a counterweight on the sleeve extending radially outwardly therefrom, a second sleeve on said first sleeve and rotatable relative thereto and a counterweight on the second sleeve extending radially outwardly therefrom, means forming a pair of axial slots in said shaft, means forming an oblique slot in one of said sleeves and means forming an oblique slot in the other of said sleeves lying in a direction opposite from said first oblique slot, a plug mounted in an axially slidable position in said shaft, a diametrically positioned pin in said plug extending outwardly through the slots in said shaft and said sleeves, said pin having one extreme position wherein said sleeves are in positions wherein the counterweights are on the same side of said shaft and another extreme position wherein the counterweights are on opposite sides of said shaft, and plug moving means connected between said plug and said base and adapted to move said plug axially between extreme positions whereby said pin is adapted to be forced along said oblique slots to rotate said counterweights between extreme positions.

2. A vibration force generator comprising a base, spaced bearings on the base, a rotating assembly mounted on the bearings comprising a hollow shaft, a sleeve on said shaft and rotatable relative thereto and a counterweight on the sleeve extending radially outwardly therefrom, a second sleeve on said first sleeve and rotatable relative thereto and a counterweight on the second sleeve extending radially outwardly therefrom, means forming a pair of axial slots in said shaft, means forming a pair of oblique slots in one of said sleeves extending in the same spiral direction, and means forming a pair of oblique slots in the other of said sleeves lying in a spiral direction opposite from said first pair of oblique slots, a plug mounted in an axially slidable position in said shaft, a diametrically extending pin in said plug extending outwardly through the slots in said shaft and said sleeves, said pin having one extreme position with said sleeves having positions wherein counterweights are on the same side of said shaft and having another extreme position wherein the counterweights are on opposite sides of said shaft, and plug moving means in said shaft engaging respectively said plug and said base adapted to move said plug axially between extreme positions whereby said pin is adapted to be forced along said oblique slots to rotate said counterweights between said extreme positions.

3. A vibration force generator comprising a base, spaced bearings on the base, a rotating assembly mounted on the bearings comprising a shaft member, a sleeve on said shaft member and rotatable relative thereto, and a counterweight on the sleeve extending radially outwardly therefrom, a second sleeve on said first sleeve and rotatable relative thereto and a counterweight on the second sleeve extending radially outwardly therefrom, means forming an oblique slot in one of said sleeves and means forming an oblique slot in the other of said sleeves lying in a direction opposite from said oblique slot, a pin carrier mounted in an axially slidable position in said shaft, a diametrically positioned pin in said carrier extending through the slots in said sleeves, said pin having one extreme position wherein said sleeves are rotated to positions wherein the counterweights are on the same side of said shaft and another extreme position wherein the counterweights are on opposite sides of said shaft, and carrier moving means engaging respectively said carrier and said base and adapted to move said carrier axially between extreme positions whereby said pin is adapted to be forced along said oblique slots to rotate said counterweights between extreme positions, said carrier moving means comprising a screw swivelly secured to the carrier, a rotating element threadably mounted on the screw, a stop on the base and an arm rotatably anchored at a free end of said screw in endwise movable and non-rotational engagement with said stop, said rotating element being adapted to shift said screw and said carrier axially thereby to rotate said counterweights relative to each other.

4. A vibration force generator comprising a base, spaced bearings on the base, a rotating assembly mounted on the bearings comprising a hollow shaft, a sleeve on said shaft and rotatable relative thereto and a counterweight on the sleeve extending radially outwardly therefrom, a second sleeve on said first sleeve and rotatable relative thereto and a counterweight on the second sleeve extending radially outwardly therefrom, means forming a pair of axial slots in said shaft, means forming a pair of oblique slots in one of said sleeves lying in one spiral direction, means forming a pair of oblique slots in the other of said sleeves lying in a spiral direction opposite from said first pair of oblique slots, a plug mounted in an axially slidable position in said shaft, a diametrically positioned pin in said plug extending outwardly through the slots in said shaft and said sleeves, said pin having one extreme position wherein said sleeves are rotated to positions wherein the counterweights are on the same side of said shaft and another extreme position wherein the counterweights are on opposite sides of said shaft, and plug moving means in said shaft engaging respectively said plug and said base adapted to move said plug axially between extreme positions whereby said pin is adapted to be forced along said oblique slots to rotate said counterweights between extreme positions, said plug moving means comprising a screw swivelly secured to the plug and rotatably mounted concentrically within said shaft, a sprocket threadably mounted on the screw at an outside end of said screw, a stop on the base and an arm rotatably anchored at a free end of said screw in endwise movable and non-rotational engagement with said stop, said sprocket being adapted to shift said screw and said plug axially thereby to rotate said counterweights relative to each other.

5. A vibration force generator comprising a base, a hollow shaft rotatably mounted on the base, a sleeve rotatably mounted on the shaft and an eccentric weight on said sleeve, a second sleeve rotatably mounted on said first sleeve and an eccentric weight thereon, means forming a central chamber in said shaft, a piston reciprocatably mounted in said chamber, means forming a hydraulic pressure chamber in said shaft between an end thereof and said piston, and a hydraulic connection for hydraulic fluid under pressure to said chamber, means forming oppositely extending oblique slots in said respective sleeves, and a pin carried by said piston extending through said slots and adapted upon movement of said piston to rotate said sleeve and the weights thereon to different relative rotative positions.

6. A vibration force generator comprising a base, a set of bearings on the base and a hollow shaft rotatably mounted thereon, a sleeve rotatably mounted on the shaft and a pair of eccentric weights on said sleeve, a second sleeve rotatably mounted on said first sleeve and an eccentric weight thereon, means forming a central chamber in said shaft, a hollow piston reciprocatably mounted in said chamber, a return spring between said piston and one end of the chamber, means forming a hydraulic pressure chamber in said shaft between the other end thereof and said piston, and a swivel hydraulic connection for hydraulic fluid under pressure in said other end, means forming oppositely extending oblique slots in said respective sleeves, means forming a longitudinal slot in said shaft and a pin in said piston extending through said slots and adapted upon movement of said piston to rotate said sleeves and the weights thereon to different relative rotative positions.

7. A symmetrically balanced vibration generator which includes: a base; a primary rotating system rotatably mounted in said base, said system including an axial chamber; a sleeve rotatably mounted on the middle portion of said primary system; a pair of eccentric end weights mounted integrally with said primary rotating system at each end thereof; a center weight integral with said sleeve, said center weight having a moment equal to said pair of end weights; a pair of primary gears, symmetrically disposed one on each side of said center weight, one connected integrally with said primary rotating system, and one connected integrally with said sleeve; a secondary shaft rotatably mounted on said base on an axis parallel to said primary rotating system; a pair of eccentric weights keyed to said secondary shaft and located at each end thereof; a centrally disposed eccentric weight equivalent in moment to said secondary end pair of weights, rotatably mounted on a central portion of said secondary shaft; a pair of secondary shaft gears meshing with said primary gears, one of said secondary gears being adapted to drive said secondary end weights in unison with said primary end weights, and the other of said gears being adapted to drive said secondary middle weight in unison with said primary middle weight; walls defining a helical slot in said primary rotating system, said helical slot encircling the axis of said primary shaft for an arc of about 90 degrees; walls defining a second helical slot in said sleeve, said second helical slot having a spiral axially coextensive with said first helical slot but opposite in direction of turn; a piston reciprocable in said axial chamber within said primary shaft, and adapted to reciprocate over an axial distance coextensive with the axial extent of said helical slots; a transverse pin means carried in said piston and projecting through said helical slot to force relative rotation between the structures carrying said center and end weights when said pin is displaced axially with respect to said slots; means for axially moving said piston in said axial chamber; and means for driving one of said shafts to place said primary and secondary end weights and center weights in rotation.

8. A symmetrically balanced vibration generator which includes: a base, a primary shaft rotatably mounted in said base, said shaft having an axial chamber; a pair of concentric sleeves rotatably mounted on said primary shaft; a pair of eccentric end weights mounted symmetrically and integrally with one of said sleeves; a center weight integral with the second of said sleeves, said center weight having a moment equal to said pair of end weights; a pair of primary gears, one on each side of said center weight, one connected integrally with each of said sleeves; a secondary shaft rotatably mounted on said base on an axis parallel to said primary shaft; a pair of eccentric weights keyed to said secondary shaft and located at each end thereof; a centrally disposed eccentric weight equivalent in moment to said secondary end pair of weights, rotatably mounted on a central portion of said secondary shaft; a pair of secondary shaft gears meshing with said primary gears, one of said secondary gears being adapted to drive said secondary end weights in unison with said primary end weights, and the other of said gears being adapted to drive said secondary middle weight in unison with said primary middle weight; walls defining a helical slot in the sleeve carrying said primary end weights, said helical slot encircling the axis of said primary shaft for an arc of approximately 90 degrees; walls defining a second helical slot in the sleeve carrying said primary center weight, said second helical slot having a spiral axially coextensive with said first helical slot but opposite in direction of turn; an elongated piston reciprocable in said axial chamber within said primary shaft, said piston being hollow and open at one end, and adapted to reciprocate over an axial distance coextensive with the axial extent of said helical slots without placing the interior of said piston in communication with said slots; a transverse pin means carried in said piston and projecting through said slots to force opposite rotation between the sleeves carrying said center and end weights when said pin is displaced axially with respect to said slots; means for introducing fluid under pressure into the interior of said primary shaft adjacent one end thereof and into the open end of said piston; spring means within said primary shaft chamber disposed on the side of said piston opposite its open end, and adapted to resiliently urge said piston toward said one end of the primary shaft to the position at one extreme end of both of said helical slots; and means for driving one of said shafts to place said eccentric weights in rotation.

9. A symmetrically balanced vibration generator which includes: a base including two parallel bearing panels; a primary shaft rotatably mounted in bearings in said bearing panels, said shaft having an axial chamber; a first sleeve rotatably mounted on said primary shaft and extending between said bearings; a pair of eccentric weights mounted integrally with said first sleeve, said weights being located one adjacent each of said bearings, and inboard of said bearings, with both weights on the same side of the axis of said primary shaft; a second sleeve rotatably mounted on said first sleeve midway between said end weights; a center weight integral with said second sleeve, said center weight having a moment equal to said pair of end weights; a pair of primary gears, one on each side of said center weight, one connected integrally with said first sleeve, and one connected integrally with said second sleeve; a secondary shaft rotatably mounted in bearings in said bearing panels, said shaft having its axis parallel to said primary shaft; a pair of secondary end weights corresponding in size and position to said primary shaft end weights, and movable integrally with said secondary shaft just inboard of its bearings; a central sleeve rotatably mounted on said secondary shaft midway between said secondary end weights; a secondary center weight integral with said secondary sleeve and corresponding in moment and position to said primary shaft center weight; a pair of secondary gears meshing with said pair of primary gears, one on each side of said secondary center weight, one connected integrally with said secondary shaft to rotate said secondary end weights in unison with said primary end weights, and one connected integrally with said secondary shaft center sleeve to rotate said secondary center weight in unison with said primary shaft center weight; walls defining a first pair of helical slots in the central part of said first sleeve, said helical slots encircling the axis of said primary shaft for an arc of approximately 90 degrees; walls defining a second pair of helical slots in said second sleeve, said second helical slots having a spiral axially coextensive with said first helical slot but opposite in direction of turn; a pair of diametrically opposite axial slots in said primary shaft, said axial slots being axially coextensive with said helical slots; an elongated piston reciprocable in said axial chamber within said primary shaft, said piston being hollow and open at one end, and adapted to reciprocate over an axial distance coextensive with the axial extent of said slots without placing the interior of said piston in communication with said slots; a transverse pin means carried in said piston and projecting through said slots to force opposite rotation of said first and second sleeves about said shaft when said pin is displaced axially with respect to said slots; swivel conduit means for introducing fluid under pressure into the interior of said primary shaft and the open end of said piston, said swivel conduit means being mounted at the axis of said primary shaft; helical spring means within said primary shaft chamber disposed on the side of said piston opposite its open end, and adapted to resiliently urge said piston toward said swivel conduit means to a position at one extreme end of said slots; and means for driving one of said shafts to place said eccentric weights in rotation.

References Cited in the file of this patent

UNITED STATES PATENTS

| | | |
|---|---|---|
| 1,225,222 | Covert | May 8, 1917 |
| 1,980,349 | Neveu | Nov. 13, 1934 |
| 2,336,996 | McDonough | Dec. 14, 1943 |
| 2,410,170 | Lazan | Oct. 29, 1946 |
| 2,709,408 | Orshansky | May 31, 1955 |